July 2, 1929.  H. W. LILJAH  1,719,665
BEARING
Filed Feb. 16, 1926
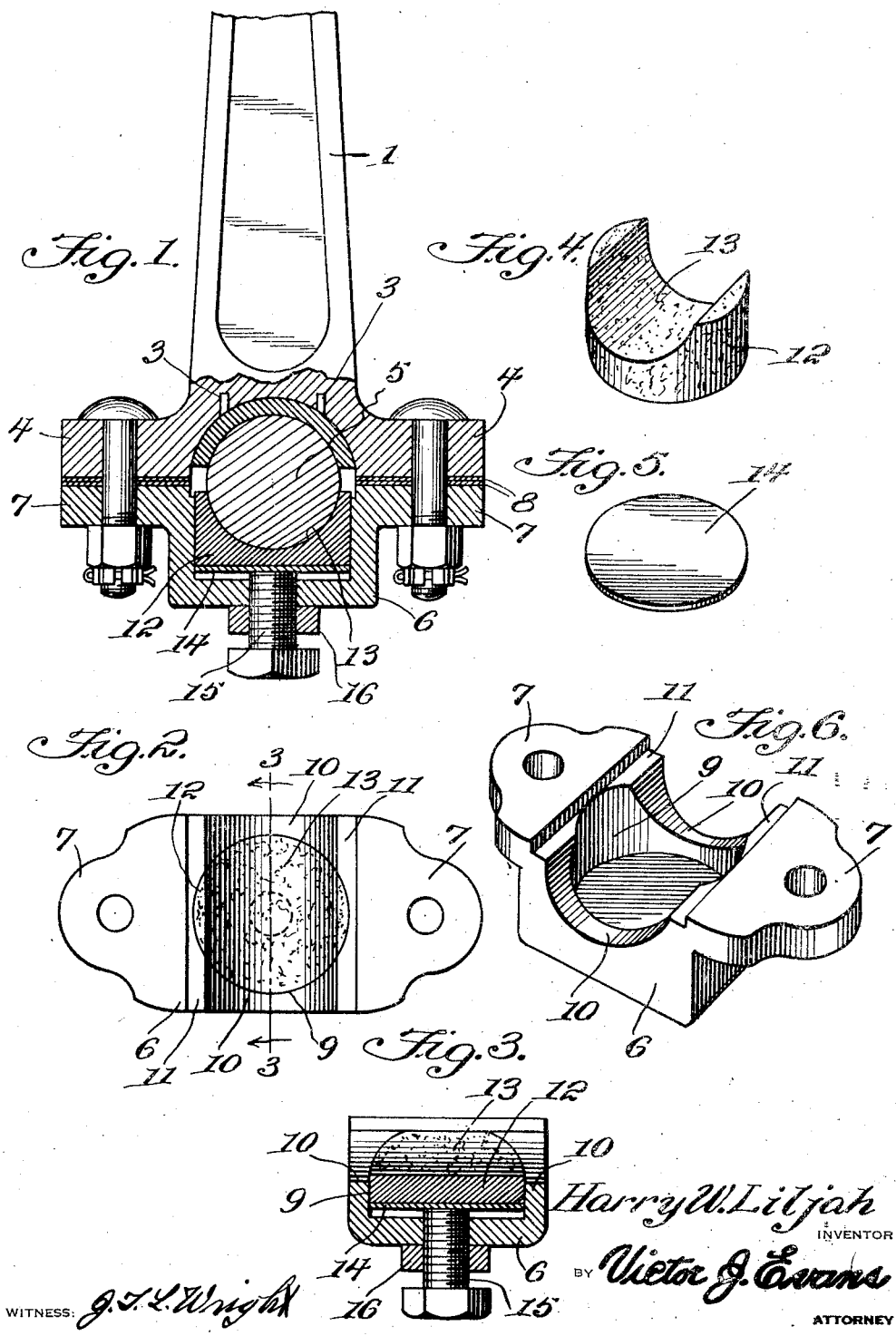
Harry W. Liljah
INVENTOR
BY Victor J. Evans
ATTORNEY
WITNESS: J. F. L. Wright Patented July 2, 1929.

1,719,665

UNITED STATES PATENT OFFICE.

HARRY W. LILJAH, OF NICHOLS, IOWA.

BEARING.

Application filed February 16, 1926. Serial No. 88,631.

My present invention has reference to a bearing for the piston connecting rod for the crank shaft of an internal combustion engine, and my primary object is to produce an adjustable bearing for this purpose whereby and whereupon the bearing may be compensated for.

A further object is the provision of a cap for the piston connecting rod for the crank shaft of an internal combustion engine, having a pocket or bore therein for the reception of a bearing block and having means for adjusting the block with respect to the lower portion of the engine shaft.

A still further object is the provision of a cap for the piston connecting rod and piston of an internal combustion engine, in which a cap of the ordinary construction may be bored to provide a pocket for a cross section around bearing block whose outer face is grooved to engage the lower portion of the crank shaft, and in which a hard metal disk bears against the outer face of a block and is held in contact therewith by a bolt member which is screwed through the cap.

To the attainment of the foregoing objects and others which will appear as the nature of the invention is better understood, the improvement further resides in certain novel features of construction, combination and operative association of parts, a satisfactory embodiment of which is disclosed by the accompanying drawings.

In the drawings,

Figure 1 is an elevation of a piston connecting rod and a cap thereon in accordance with my invention, parts being in section.

Figure 2 is a face view of the cap.

Figure 3 is a section on the line 3—3 of Figure 2.

Figure 4 is a perspective view of the bearing block.

Figure 5 is a similar view of a metal disk.

Figure 6 is a similar view of the cap.

The piston connecting rod 1 is of usual construction, having its outer face centrally channeled for the reception of a semi-circular bearing 2, of Babbitt metal. Pins 3 hold the bearing on the rod. The rod is provided with the usual outstanding ears 4 disposed opposite the bearing 2, and the bearing is, of course, engaged by the engine crank shaft 5.

My improved cap preferably includes a substantial rectangular body portion 6, concaved on its upper face in the usual manner and provided with outstanding ears 7 to underlie the ears 4 and to be secured thereto by the usual bolts which are engaged by the usual nuts. Bearing plates 8 are arranged between the confronting ears 4 and 7. The cap 6, from its outer face is centrally formed with a round depression providing a pocket 9, and the concave walls 10 of the cap merge into transverse channels 11, whose purpose for the present will be apparent.

Received in the pocket 9 there is the cross sectionally rounded body portion 12 of a bearing block of Babbitt metal. The bearing block has its outer face concaved as at 13, the inner and flat face of the said bearing block is engaged by a hard metal disk 14. The body 6 has a threaded opening which communicates with the pocket 9, and screwed through this opening there is a bolt member 15 which contacts with the washer 14 and holds the same against the bearing block 12. The bolt 15 has threaded thereon a lock nut 16 which contacts with the outer face of the cap 6.

The simplicity and advantages of the improvement will, it is thought, be perfectly apparent to those skilled in the art to which this invention relates when the foregoing description is carefully read in connection with the accompanying drawings. It will be apparent that by adjusting the bolt 15 the bearing block 12 will be brought into proper contact and engagement with the lower portion of the shaft 5, so that all wear upon the bearing of the shaft can be thus easily compensated for without dismantling the parts. By employing the hard metal disk 14 and by arranging the tubular block 12 in the cylindrical pocket 9 all parts of the bearing block will be forced into positive engagement with the shaft. It will be further apparent that the improvement is susceptible to use in connection with ordinary caps, as it is merely necessary to bore a pocket in such caps and arrange therein a bearing block similar to the block 12. It will be further noted that by providing cap with the notches 11, the bearings will be at all times lubricated and the wear thereon consequently greatly reduced.

Having thus described my invention, I claim:—

A cap for a piston connecting rod for the crank shaft of an internal combustion engine, comprising a substantially rectangular plate at right angles thereto, a recess in the plate, a bearing block therein having a concave cylindrical face, a cap plate having a circular recess, a round bearing block having a concave cylindrical face to engage the shaft, a metal plate adjacent the block engaging its flat face, bolts connecting the plates, and a screw for adjusting the cap bearing block.

In testimony whereof I affix my signature.

HARRY W. LILJAH.